US011275222B2

(12) United States Patent
Rosenberg et al.

(10) Patent No.: US 11,275,222 B2
(45) Date of Patent: Mar. 15, 2022

(54) SOLDER-ALIGNED OPTICAL SOCKET WITH INTERPOSER REFERENCE AND METHODS OF ASSEMBLY THEREOF

(71) Applicant: Hewlett Packard Enterprise Development LP, Houston, TX (US)

(72) Inventors: Paul Kessler Rosenberg, Sunnyvale, CA (US); Sagi Varghese Mathai, Sunnyvale, CA (US); Kevin B. Leigh, Houston, TX (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/863,610

(22) Filed: Apr. 30, 2020

(65) Prior Publication Data

US 2021/0341690 A1 Nov. 4, 2021

(51) Int. Cl.
*H04B 10/00* (2013.01)
*G02B 6/42* (2006.01)

(52) U.S. Cl.
CPC ......... *G02B 6/4232* (2013.01); *G02B 6/4246* (2013.01); *G02B 6/4257* (2013.01)

(58) Field of Classification Search
CPC combination set(s) only.
See application file for complete search history.

(56) References Cited

U.S. PATENT DOCUMENTS

| 6,477,286 B1* | 11/2002 | Ouchi | G02B 6/10 |
| | | | 257/433 |
| 6,491,446 B1 | 12/2002 | Kryzak | |
| 7,287,914 B2* | 10/2007 | Fujiwara | G02B 6/4214 |
| | | | 385/52 |
| 7,333,683 B2 | 2/2008 | Sasaki et al. | |

(Continued)

OTHER PUBLICATIONS

Barwicz et al., "Silicon Nanophotonic Packaging", available online at <https://researcher.watson.ibm.com/researcher/view_group_subpage.php?id=6425>, IBM, retrieved on May 11, 2020, 6 pages.

*Primary Examiner* — Agustin Bello
(74) *Attorney, Agent, or Firm* — Hewlett Packard Enterprise Patent Department (57) ABSTRACT

Optoelectronic systems and methods of assembly thereof are described herein according to the present disclosure. An example of an optoelectronic described herein includes a substrate and an interposer coupled to the substrate including one or more optical emitters and one or more photodetectors to be mounted thereto. The interposer is fabricated with one or more mechanical datums located on the interposer with respect to flip chip pads to position and couple the optical emitters and photodetectors to the interposer. The optoelectronic system also includes an optical connector and an optical socket that includes one or more mechanical datums corresponding to the mechanical datums of the interposer. The optical socket is configured to align the optical connector with the optical emitters and the photodetectors when the optical socket is coupled to the substrate and the optical connector is received within the optical (Continued)

socket. The mechanical datums of the optical socket contact respective mechanical datums of the interposer when the optical socket is coupled to the substrate.

20 Claims, 6 Drawing Sheets

(56) References Cited

U.S. PATENT DOCUMENTS

| | | | | |
|---|---|---|---|---|
| 7,419,312 B2 * | 9/2008 | Nagasaka | ............ | G02B 6/4204 |
| | | | | 385/88 |
| 7,534,052 B2 * | 5/2009 | Fujiwara | .............. | G02B 6/4292 |
| | | | | 385/88 |
| 8,188,381 B2 * | 5/2012 | Chan | .................... | H05K 9/0035 |
| | | | | 174/382 |
| 8,200,056 B2 * | 6/2012 | Baugh | ................. | G02B 6/4249 |
| | | | | 385/49 |
| 8,317,411 B2 * | 11/2012 | Fujiwara | .............. | G02B 6/4292 |
| | | | | 385/92 |
| 8,731,347 B2 * | 5/2014 | Chan | ........................ | G02B 6/43 |
| | | | | 385/14 |
| 8,926,199 B1 * | 1/2015 | Chan | .................... | G02B 6/4249 |
| | | | | 385/93 |
| 9,106,027 B2 | 8/2015 | Chan et al. | | |
| 9,784,929 B2 * | 10/2017 | Droesbeke | ............. | G02B 6/423 |
| 9,897,769 B2 * | 2/2018 | Li | ........................ | G02B 6/4257 |
| 9,939,598 B2 * | 4/2018 | Kurtz | ................... | G02B 6/4292 |
| 10,200,187 B2 * | 2/2019 | Xu | ........................ | G02B 6/4269 |
| 10,348,015 B2 * | 7/2019 | Mason | ................ | H05K 1/0203 |
| 10,678,006 B2 * | 6/2020 | Rosenberg | ........... | G02B 6/4249 |
| 10,795,091 B2 * | 10/2020 | Rosenberg | ............. | G02B 6/423 |
| 2010/0135618 A1 * | 6/2010 | Howard | ............... | G02B 6/4214 |
| | | | | 385/79 |
| 2010/0215325 A1 * | 8/2010 | Tamura | ................ | G02B 6/4214 |
| | | | | 385/89 |
| 2013/0108223 A1 * | 5/2013 | McColloch | ........... | G02B 6/423 |
| | | | | 385/89 |
| 2013/0287404 A1 * | 10/2013 | McColloch | .......... | G02B 6/4246 |
| | | | | 398/135 |
| 2014/0179129 A1 * | 6/2014 | Chan | .................. | H01R 12/7029 |
| | | | | 439/78 |
| 2019/0033542 A1 * | 1/2019 | Epitaux | ............... | G02B 6/4246 |
| 2020/0144151 A1 * | 5/2020 | Bettman | ............ | H01L 23/3672 |
| 2020/0373285 A1 * | 11/2020 | Hovis | ..................... | H01L 23/13 |

* cited by examiner

SOLDER-ALIGNED OPTICAL SOCKET WITH INTERPOSER REFERENCE AND METHODS OF ASSEMBLY THEREOF

BACKGROUND

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Optoelectronic systems or devices such as photonic integrated circuits (PICs) having a plurality of electronic, optical, and optoelectronic components may be used to convert, transmit, or process the optical signals or electronic data. Optical signals may be carried, transmitted, or propagated from board to board, chip to chip, system to system, server to server, or device to device via various transmission media including one or more optical connectors.

BRIEF DESCRIPTION OF THE DRAWINGS

Certain examples are described in the following detailed description and in reference to the drawings, in which:

FIG. 28 illustrates a top view of the interposer of FIG. 2A;

DETAILED DESCRIPTION OF SPECIFIC EXAMPLES

Generally, an optoelectronic system or device includes one or more optical connectors to carry, transmit, or propagate optical signals on or off of the optoelectronic system (e.g., chip, substrate, package, die) or between chips on the same substrate. The optical connectors may require precisely molded parts or components to provide proper alignment (e.g., micron-level alignment or tolerance) between certain components of the optoelectronic system (e.g., an optoeletronic component and an optical ferrule of the optical connector).

An example of such a precise part is an optical socket configured to receive an optical ferrule, into which are assembled one or more optical fibers, which, in turn, are aligned with respect to an optoelectronic component (e.g., disposed on or within a substrate of an optoelectronic system). The optical socket is typically precisely aligned with the optoelectronic component and subsequently bonded to a substrate that may include or comprise one or more of an electronic printed circuit board (PCB) or other suitable circuit board (e.g., silicon, organic, glass material), a substrate layer disposed over the circuit board, a silicon interposer, or a combination of an interposer bonded on top of a circuit board or substrate layer. More complex structures, consisting of multiple stacked layers of organic substrates and Si interposers, are also possible.

Typically, optoelectronic systems include one or more optoelectronic components such as optoelectronic arrays (e.g., optical emitters or photodetectors) mounted to an interposer (e.g., a silicon interposer). The interposer is coupled to a substrate thereunder. An optical connector including an optical ferrule and optical fiber as discussed above is configured to be aligned (e.g., optically) with the optoelectronic arrays on the interposer via an optical socket. The optical socket may be aligned and coupled to the substrate via solder pads on the substrate and a solder reflow process. This typically requires placement of the solder relative to guide pin holes on the optical socket with high precision (e.g., a tight tolerance of or within about 2 um). Such precise assembly requirements lead to increased assembly costs due to, for example, the precision manufacturing equipment, machine-vision-aligned assembly equipment and installation time required to meet such a tight tolerance.

In accordance with implementations of the present disclosure, an improved optoelectronic system is described herein that eliminates or minimizes the precision required in positioning solder on an optical socket in order to accurately position the optical socket relative to the substrate and interposer (e.g., such that the optical connector received within the optical socket is aligned with the optoelectronic arrays on the interposer). In contrast, as described in further detail below, by registering or locating the optical socket against precision etched edges (e.g., mechanical datums) on the interposer, acceptable solder placement tolerance can be increased (e.g., up to and including 30 um or more). Further, by using the interposer as the position or location reference (e.g., for the optoelectronic arrays to be mounted thereon, the substrate, and the optical socket), overall assembly tolerance can be improved (e.g., decreased or cut by half) such that a tolerance of about 2.0 RMS (root-mean square) is achievable as compared to using substrate solder pads for reference. Therefore, placement accuracy and ease of socket fabrication are improved which can result in decreased assembly time and costs.

The optoelectronic system as described herein includes a substrate and an interposer coupled to the substrate including one or more optical emitters and one or more photodetectors mounted thereto. The interposer is fabricated with one or more mechanical datums. The mechanical datums are referenced (e.g., located on the interposer with respect) to flip chip pads for positioning and coupling the optical emitters and photodetectors to the interposer. Thus, when coupled to the interposer via the flip chip pads, the optical emitters and photodetectors are precisely located on the interposer with respect to the mechanical datums, as described in further detail below. The optoelectronic system also includes an optical connector having a ferrule and an optical fiber coupled to the ferrule. An optical socket to be coupled to the substrate includes one or more mechanical datums corresponding to the mechanical datums of the interposer. The optical socket is configured to align the optical connector with the emitters and the photodetectors on the interposer when the optical socket is coupled to the substrate and the optical connector is received within the optical socket. The mechanical datums of the optical socket contact respective mechanical datums of the interposer when the optical socket is coupled to the substrate.

The solder-aligned surface-mount optical socket is used to position and align the optical connector relative to the optical emitters and photodetectors. The optical emitters and photodetectors are precisely aligned and mounted to the interposer via flip chip pads. Mechanical datums are fabricated on the interposer and precisely located with respect to the flip chip pads and thus the position of the emitters and detectors to be mounted thereto. As the mechanical datums and flip chip pads are formed on the interposer via lithographic processes and the mechanical datums being further formed via dry or wet etching processes, both are precisely located thereon relative to each other. Thus, when the optical emitters and photodetectors are mounted on the interposer via the flip chip pads, they are precisely referenced (e.g., located) with respect to the mechanical datums thereon. For example, the optical emitters and photodetectors are solder self-aligned to the flip chip pads on the interposer.

The optical socket is fabricated with the corresponding mechanical datums and solder attach features (e.g., metal pads) to be coupled to the substrate. In some implementations, when the optical socket is subject to a solder reflow process to couple the optical socket to the substrate, surface tension in the solder draws the optical socket towards the interposer until the optical socket mechanical datums are in contact against the corresponding interposer mechanical datums. In other implementations, the optical socket can be positioned (e.g., by a user or machine) on the substrate such that the corresponding mechanical datums are in contact against each other. The optical socket can then be adhered in position on the substrate.

The systems and processes as described herein achieve precise location or positioning between the optical socket and optical emitters and photodetectors such that when the optical connector is inserted into the optical socket, the optical connector is brought into precise alignment with the optical emitters and photodetectors. Implementations of the present disclosure provide improved optoelectronic systems or methods of assembling the same. Such improved optoelectronic systems can simplify the assembly process, remove or reduce need for precision assembly equipment, enable use of a high volume automated flip chip assembly process, reduce assembly time and costs, or improve overall assembly tolerance.

Figure 1A:
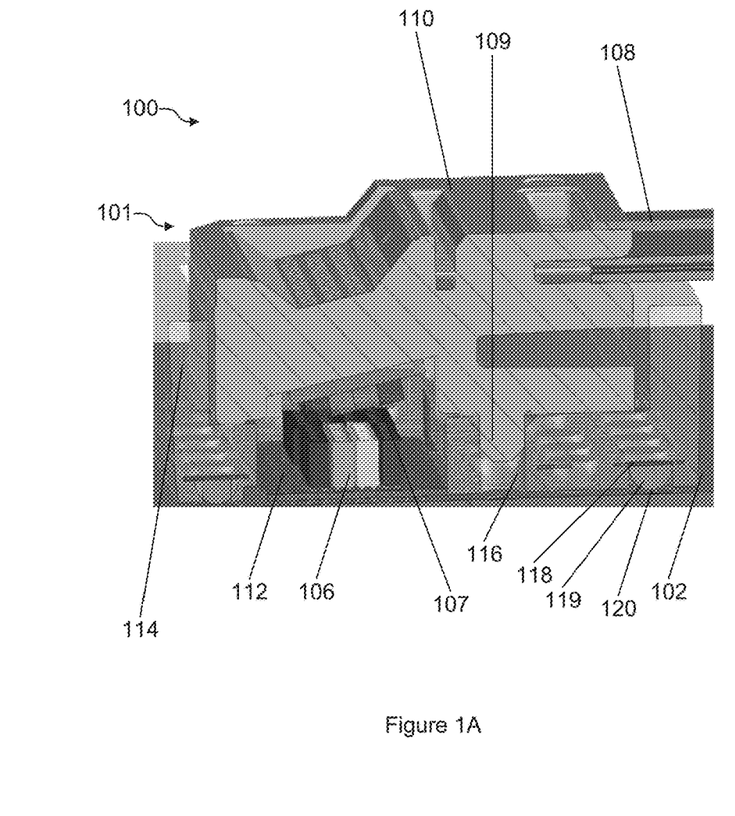
FIG. 1A illustrates a section view of an example of an optoelectronic system according to an implementation of the present disclosure.
Figure 1B:
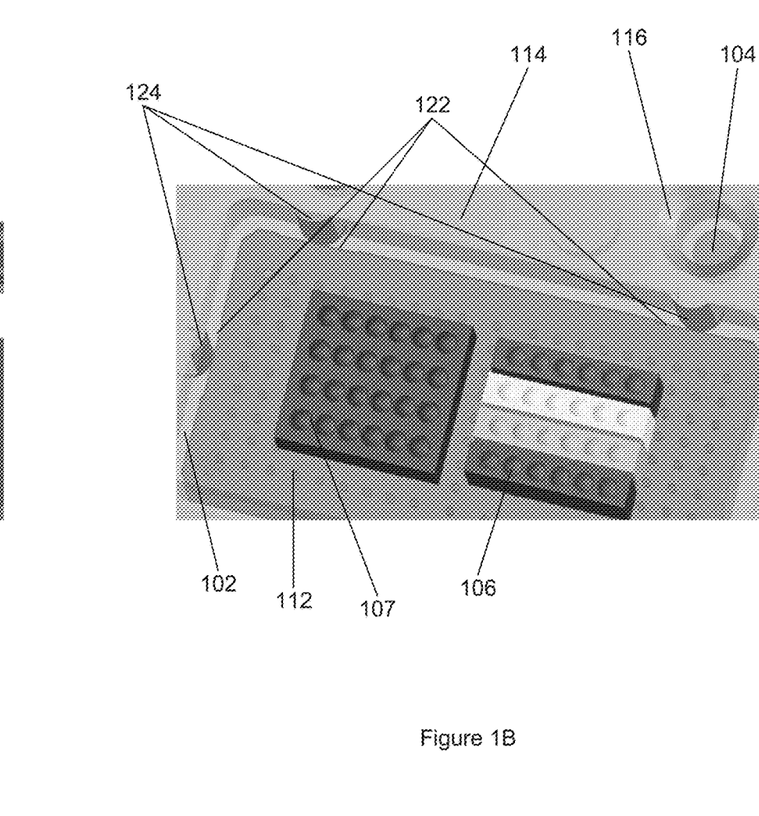
FIG. 1B illustrates an top view of a portion of the optoelectronic system of FIG. 1A with an optical connector and portion of an optical socket of the optoelectronic system removed to avoid obscuring certain features of the optoelectronic system.

FIGS. 1A-1B illustrate an example of an optoelectronic device or system 100 according to the present disclosure. The optoelectronic system 100 includes a substrate 102 (e.g., an organic substrate layer), an interposer 112 (e.g., silicon interposer) disposed on the substrate 102 having arrays of optoelectronic components (e.g., an array of optical emitters 106 and an array of photodetectors 107) mounted thereon. The optoelectronic system 100 includes an optical connector 101 having a ferrule 110 and an optical fiber 108 coupled to the ferrule 110 (e.g., a single mode, polarization maintaining, or multi-mode optical fiber or array of fibers). The optoelectronic system 100 also includes an optical socket 114 configured to receive the ferrule 110 therein to align the optical connector 101 (e.g., the ferrule 110 and the optical fiber 108) to the arrays of optical emitters 106 and photodetectors 107 when the ferrule 110 is received therein, and the optical socket 114 is coupled to the substrate 102.

Once aligned, optical signals can be transmitted from the optical emitters 106 off the substrate 102 via the optical connector 101 and vice versa, optical signals propagating from the optical connector 101 can be received onto the substrate 102 via the photodetectors 107. For example, the optoelectronic system can be an optical transceiver which in the transmission mode, transforms electrical signals into optical signals which are transmitted through the one or more optical emitters 106 and into the ferrule 110. When operating in a receive mode, optical signals are transmitted from the ferrule 110 to the photodetectors 108 and converted into electrical signals (e.g., for processing). As illustrated, in some implementations, only these optical signals (e.g., without electrical signals) are propagated through the optical socket 114 between the ferrule 110 of the optical connector 101 and the optical emitters 106 and photodetectors 107 on the interposer 112.

Figure 2A:
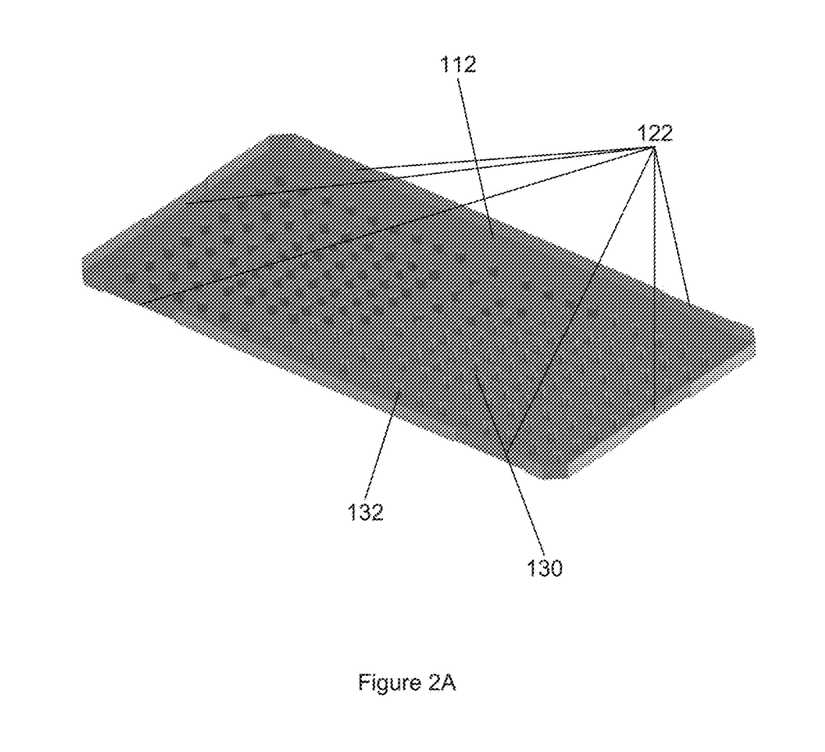
FIG. 2A illustrates a top perspective view of an interposer of the optoelectronic system of FIG. 1A in accordance with an implementation of the present disclosure.
Figure 2B:
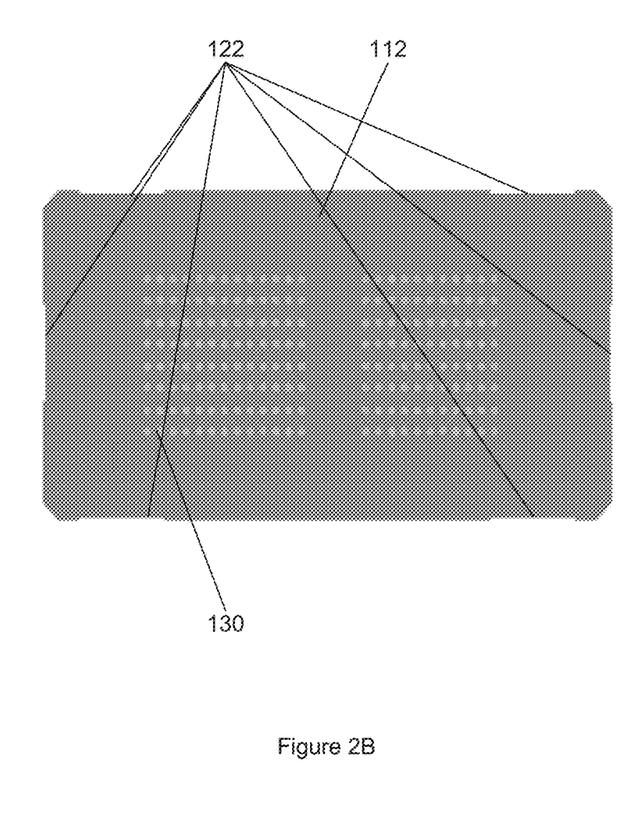

With reference to FIGS. 1A-1B and the detailed views of FIGS. 2A-2B of the interposer 112, the interposer 112 is fabricated with one or more mechanical datums 122 (e.g., on one, two, three, or four sides of the interposer 112). The mechanical datums 122 are fabricated and located on the interposer 112 with respect to positions of the flip chip pads 130 for mounting the optical emitters 106 and photodetectors 107 to the interposer 112. The optical emitters 106 and photodetectors 107 are precisely positioned and mounted to the interposer 112 via the flip chip pads 130 (see FIGS. 5A-5B) on a top or front side of the interposer 112. In this manner, the positions of the optical emitters 106 and photodetectors 107 to be mounted to the interposer 112 are precisely reference or located on the interposer 112 with respect to or relative to the mechanical datums 122.

Further, as the mechanical datums 122 and flip chip pads 130 are formed on the interposer 112 via lithographic processes and the mechanical datums 112 being further formed via dry or wet etch processes, both are precisely located thereon relative to each other (e.g., tolerance of or within 1.0 µm). Thus, when the optical emitters 106 and photodetectors 107 are mounted on the interposer 112 via the flip chip pads 130, they are precisely located with respect (e.g., tolerance of or within 1.0 µm) to the mechanical datums 122 thereon. The interposer 112 also includes pads 132 on a rear or back side such that the interposer 112 can be flip chip assembled to the substrate 102 via an array of inner pads 140 on the substrate 102 as described in further detail with respect to FIGS. 4 and 5A-5B.

While not specifically illustrated in FIGS. 1A-1B or 2A-2B, the interposer 112 may include multiple layers (e.g., conducting, semiconductor, dielectric, or insulating layers). For example, the interposer 112 may include an insulating layer sandwiched between semiconductor layers. The interposer 112 may be a silicon-on-insulator (SOI) or a silicon-on-glass substrate. In some implementations, the interposer 112 includes an insulating layer such as a buried oxide (BOX) layer composed of silicon dioxide or other insulating oxide material. In yet other implementations, the insulating layer is composed of another insulating material such as sapphire, diamond, or glass.

Figure 3A:
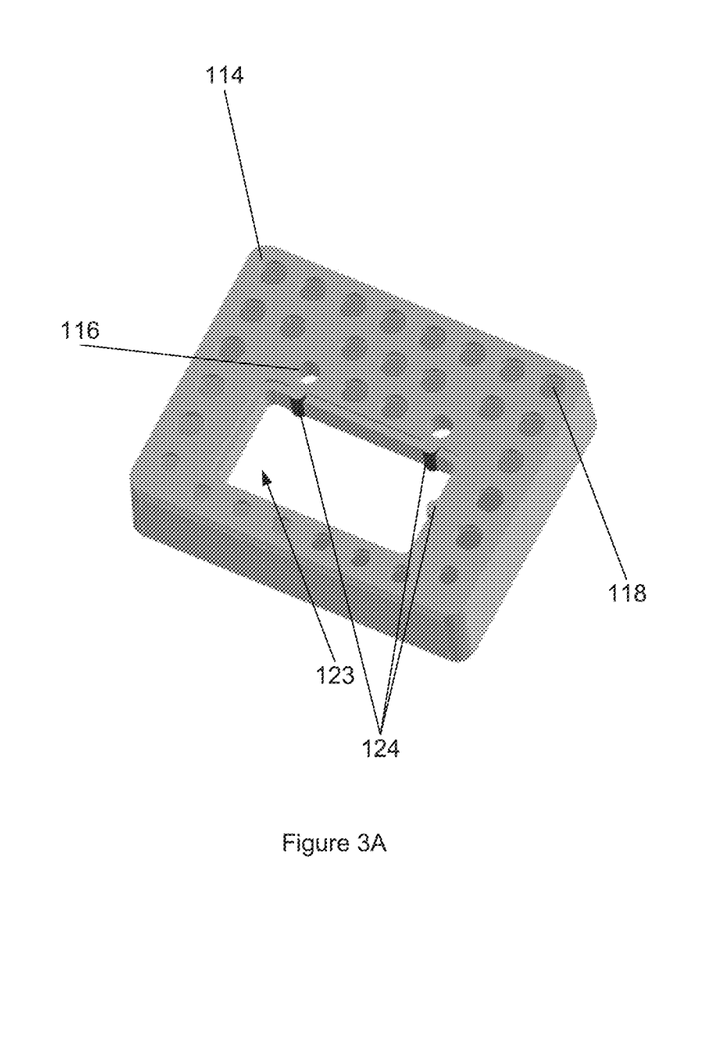
FIG. 3A illustrates a bottom perspective view of the socket of the optoelectronic system of FIG. 1A in accordance with an implementation of the present disclosure.
Figure 3B:
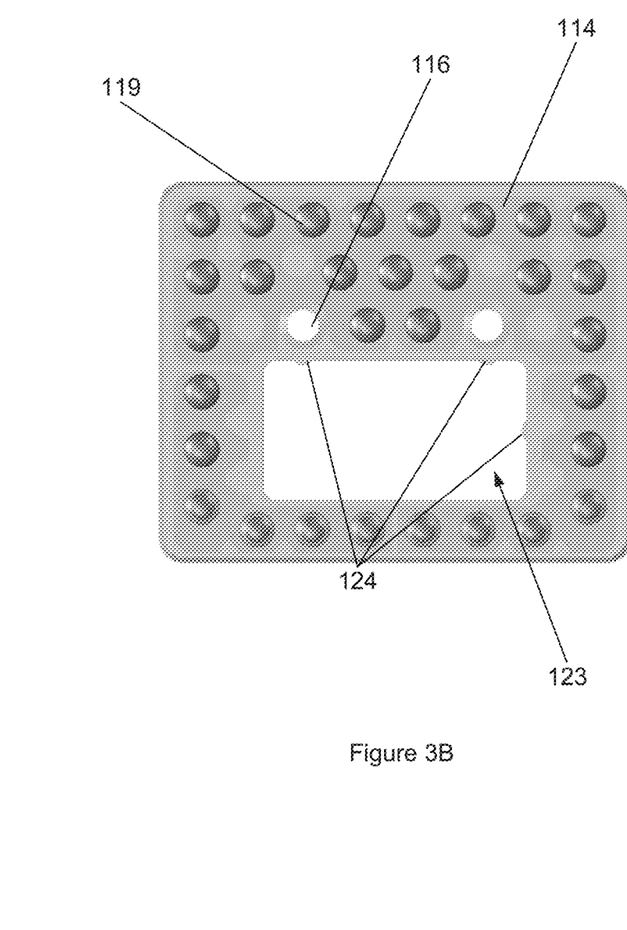
FIG. 3B illustrates a bottom view of the interposer of FIG. 3A with solder applied to pads of the interposer.

With reference to FIGS. 1B and 3A-3B, a bottom surface of the optical socket 114 to be coupled to the substrate 102 also includes one or more mechanical datums 124 corresponding to the mechanical datums 122 of the interposer 112. During assembly, the mechanical datums 124 of the optical socket 114 are pulled in contact with respective mechanical datums 122 of the interposer 112 when the optical socket 114 is coupled to the substrate 102. As discussed above, the optical socket 114 is used to position and align the optical connector 101 relative to the optical emitters 106 and photodetectors 107. The optical socket 114 is fabricated with the corresponding mechanical datums 124 and solder attach features (e.g., metal pads 118) to be coupled to a corresponding array of outer pads 120 of the substrate 102 via solder 119. In other implementations, as discussed above, the optical socket 114 can be positioned (e.g., by a user or machine) on the substrate 102 such that the corresponding mechanical datums 122 and 124 are in contact against each other. The optical socket 114 can then be adhered in position on the substrate 102 such that the mechanical datums 122 and 124 remain in contact with each other.

When the optical socket 114 is subject to a solder reflow process to couple the optical socket 114 to the substrate 102, surface tension in the solder draws the optical socket 114 towards the interposer 112 coupled to the substrate 102 until the optical socket mechanical datums 124 are in contact with the interposer mechanical datums 122. Once the corresponding mechanical datums 122 and 124 are in contact with each other, further movement of the optical socket 114 ceases or stops (e.g. relative the interposer 112 that can be previously secured via underfill to the substrate 102). When the corresponding datums 122 and 124 are in contact, precise location or positioning of the optical socket 114 relative to the optical emitters 106 and photodetectors 107 is achieved such that when the optical connector 101 is inserted into the optical socket 114, the optical connector 101 is brought into precise alignment with the optical emitters 106 and photodetectors 107.

In other implementations, the optical socket 114 can be coupled to the substrate 102 and secured in position with underfill prior to coupling the interposer 112 to the substrate 102. In such implementations, the interposer 112 moves relative to the optical socket 114 until the mechanical datums 122 of the interposer 112 are in contact with the mechanical datums 124 of the optical socket (e.g., ceasing movement of the interposer 112). In yet further implementations, both the optical socket 114 and interposer 112 can move relative to each other until the corresponding mechanical datums 122 and 124 are in contact with each other (e.g., ceasing motion of both the optical socket 114 and the interposer 112).

While the mechanical datums 122 are illustrated as etched straight-edge slots or recesses and the mechanical datums 124 as dome-shaped protrusions, in other implementations, the protruded mechanical datums may have angled shapes such as triangular and the recessed mechanical datums may have complementary angled shaped-recesses. In some implementations, the corresponding datums 122 and 124 can both be protrusions configured to contact each other. In some implementations, based on the shape of the datums 122 and 124, they can be configured to make contact at a point (e.g., single contact point) or along a surface or line. In some implementations, the corresponding datums 122 and 124 or outer edges or surfaces of the datums of the interposer 112 or the optical socket 114 are formed from or coated with a low friction material such as, but not limited to, Teflon and Parylene. This can provide, for example, improved movement of the optical socket relative to the interposer (e.g., during a solder reflow process).

As illustrated, the optical socket 114 is also fabricated with one or more guide pin holes 116 configured to receive corresponding pins 109 of the optical connector 101 when the optical connector 101 is installed or otherwise received within the optical socket 114 to align the optical connector 101 and optoelectronic arrays on the interposer 112. The optical socket 114 includes an opening or window 123 configured to extend around the optical interposer 112 when installed on the substrate 102. The guide pin holes 116 of the optical socket 114 may likely be offset, e.g., not radially aligned, with respect to guide pin pads 104 on the substrate 102 when the socket 114 is initially located or positioned on the substrate 102. As such, there is a gap between the mechanical datums 122 of the interposer 112 and the mechanical datums 124 of the optical socket 114. When subject to a solder reflow process as described herein, relative movement of the optical socket 114 and the interposer 112 can result in the guide pin holes 116 being radially aligned to the guide pin pads 104 on the substrate 102. In some implementations, alignment or relative locations of the components described herein (e.g., optical connector 101 to optoelectronic arrays) can be verified by measuring positions of the guide pin holes 116 relative to the optical emitters 106 or photodetectors 107.

Figure 4:
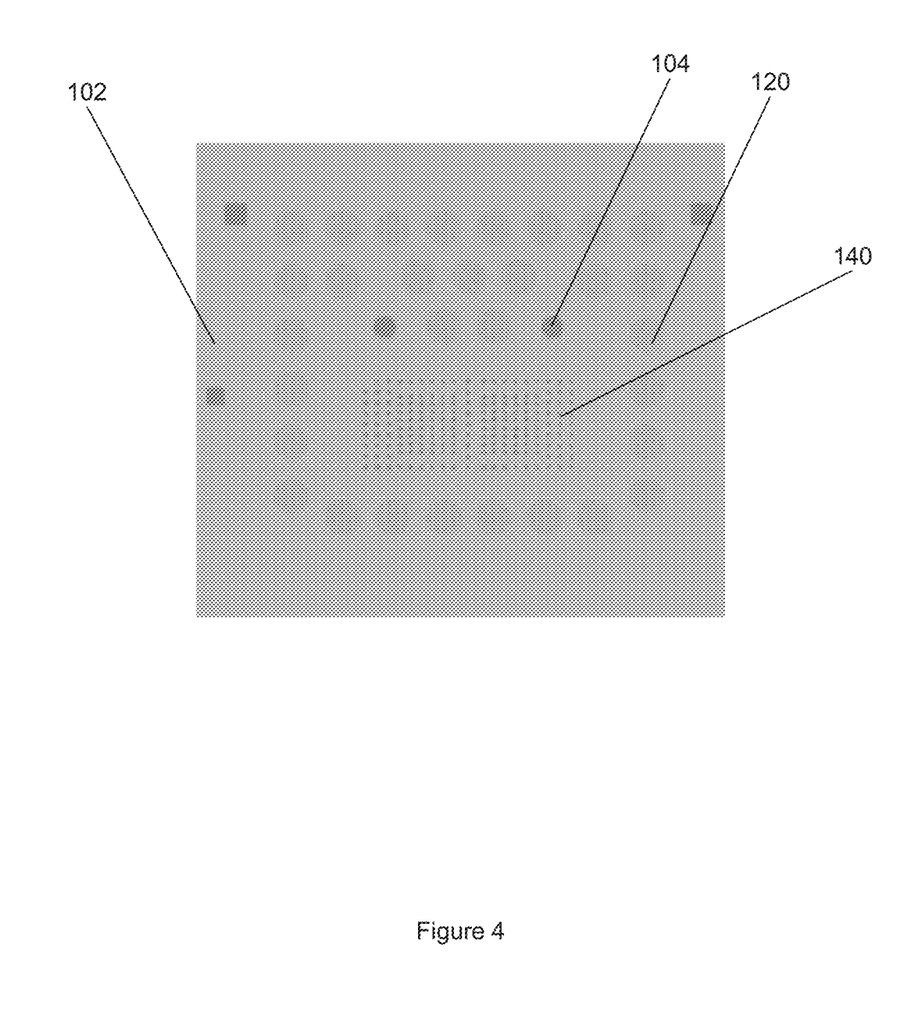
FIG. 4 illustrates a top view of a substrate of the optoelectronic system of FIG. 1A in accordance with an implementation of the present disclosure.

With reference to FIGS. 1A-1B and FIG. 4, as described herein, the substrate 102 may include a substrate layer disposed over a circuit board. The substrate 102 may serve as a foundation or common carrier for electronic and the optoelectronic components mounted or otherwise disposed on the interposer 112. For example, one or more electronic components (e.g., an ASIC, not illustrated) and the one or more optical emitters 106 and photodetectors 107 can be disposed on or within the interposer 112. The optoelectronic system 100 may incorporate other components or elements such as waveguides, electro-optical modulators, or other electro-optical components used to convert an electrical signal to a light signal or vice versa.

As discussed above, the substrate 102 includes the inner array of pads 140 that the corresponding flip chip pads 132 of the interposer 112 can be mounted to during a flip chip assembly process. Additionally the substrate 102 includes the outer array of pads 120 extending around a perimeter of the inner array of pads 140 that the pads 118 of the optical socket 114 can be soldered to in order to mount the optical socket 114 to the substrate 102. Further, the substrate 102 is fabricated with the guide pin pads 104 corresponding to the guide pin holes 116 of the optical socket 114.

As discussed above, the interposer 112 and the optical socket 114 can include one or more corresponding mechanical datums 122 and 124 configured to contact each other such that the optical socket 114 is properly positioned relative to the optoelectronic arrays on the interposer 112. As illustrated, the mechanical datums 122 and 124 can extend along one or more sides or edges of the interposer 112 and optical socket 114 (e.g., sides of the window 123), respectively. Further, the interposer 112 and optical socket 114 can include one, two, or more mechanical datums 122 and 124 along each side or edge.

In some implementations, one or more corresponding mechanical datums (e.g., two) are located or positioned on a same or single side of the interposer 112 and the optical socket 114, respectively. When only a single mechanical datum is provided or all mechanical datums are on a same side (e.g., collinear), precise alignment or reference is provided along a single axis (e.g., an x- or y-axis). When precise alignment or reference is required along two axes (e.g., both the x- and y-axis), then the interposer 112 and the optical socket 114 includes two or more (e.g., a pair of) corresponding mechanical datums on different sides or non-collinear sides of the interposer 112 and optical socket 114, respectively. For example, the mechanical datums 122 and 124 can be on two sides extending at an orthogonal, oblique, acute, or obtuse angle relative to each other (e.g., depending on profile or footprint of the optical socket and interposer). Further, while illustrated as having a substantially rectangular cross-sectional footprint, the optical socket 114 and interposer 112 can have different shaped footprints (e.g., square, triangular, diamond, or non-geometric shapes).

Figure 5A:
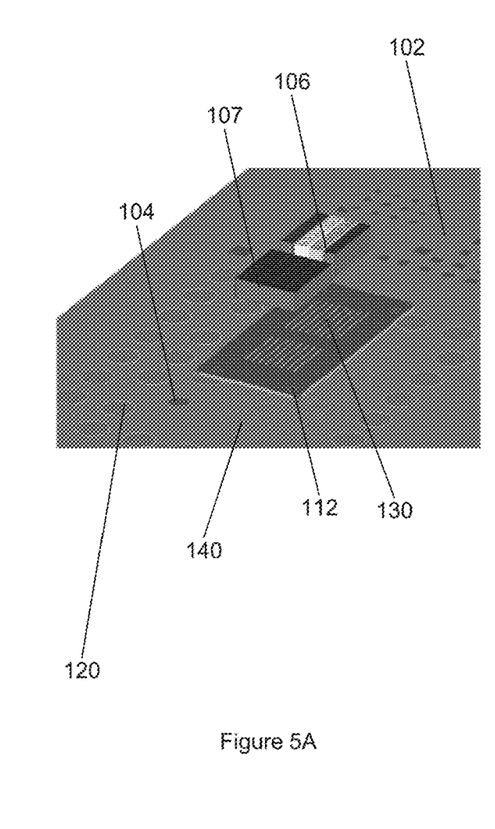
FIGS. 5A-5F illustrate various views of an example sequence of steps of assembling components of the optoelectronic system of FIGS. 1A-1B together in accordance with an implementation of the present disclosure.
Figure 5B:
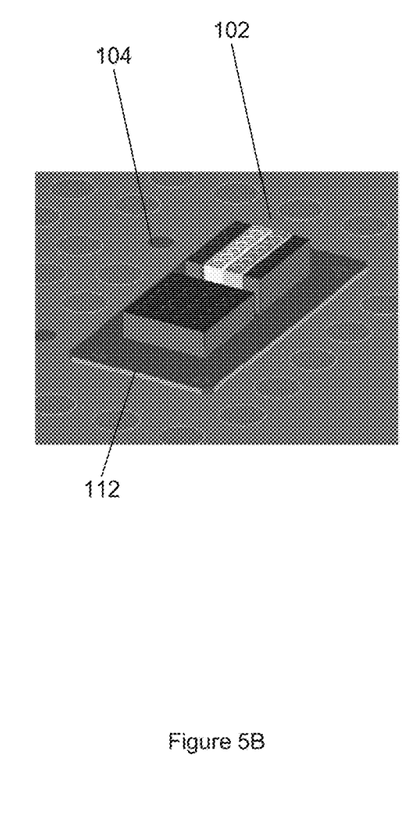

With reference to FIGS. 5A-5F, an example sequence of assembly and alignment steps of the optoelectronic system 100 as described herein is illustrated. As illustrated in FIGS. 5A-5B, the optical emitters 106 and photodetectors 107 can be flip chip assembled to the interposer 112 via the flip chip pads 130. The interposer 112 with the optical emitters 107 and the photodetectors mounted thereto can then be flip chip assembled to the substrate 102 via the inner array of pads 140. In some implementations, the interposer 112 can be coupled to the substrate 102 prior to coupling the optical emitters 106 and photodetectors 107 to the interposer 112. The optical emitters 106 and photodetectors 107 can be solder reflow attached to the interposer 112 and the interposer can be in-turn solder reflow attached to the substrate 102 accordingly. As discussed above, because the flip chip pads 130 and the mechanical datums 122 are both formed in the interposer 112 with lithographic and/or etching processes, the optical emitters 106 and the photodetectors 107 mounted on the flip chip pads 130 (FIG. 5B) are now precisely located or positioned with respect to the mechanical datums 122.

Figure 5C:
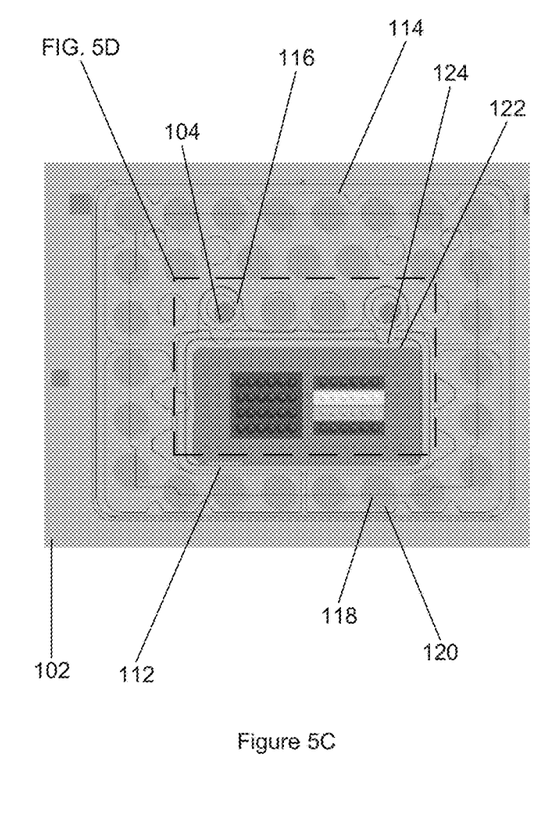
Figure 5D:
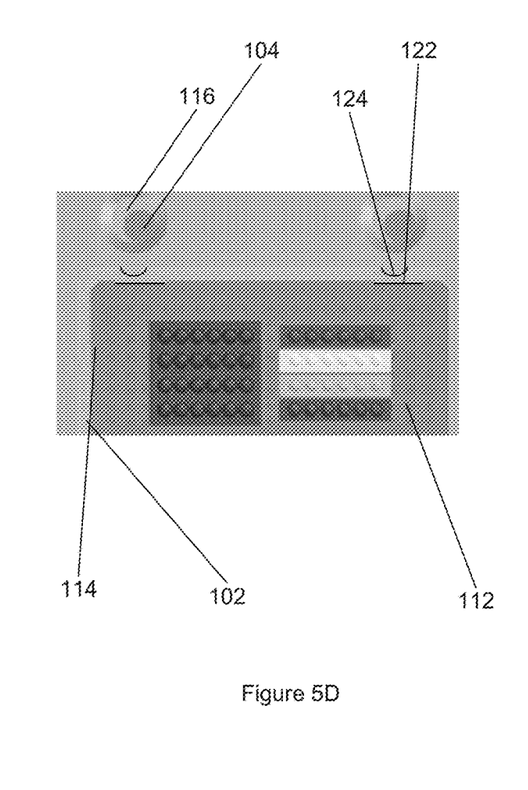
Figure 5E:
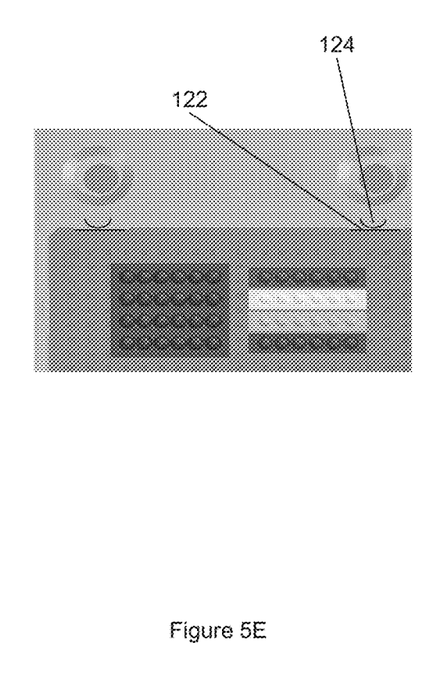

As illustrated in FIG. 5C and the close-up view in FIG. 5D, the optical socket 114 can then be positioned on the substrate 102 in an initial or first positioned prior to a solder reflow process. In the initial position (FIG. 5D), the solder pads 118 and the guide pin holes 116 of the optical socket are offset (e.g., not aligned) with the corresponding outer array of pads 120 and guide pin pads 104 of the substrate 102 such that the corresponding mechanical datums 122 and 124 are spaced apart by a gap. The gap can be between 100 and 200 µm (e.g., 150 µm). During the solder reflow process, solder liquefies at temperature and surface tension in the optical socket attached solder 119 draws the optical socket 114 towards the interposer 112, (FIG. 5E) reducing or minimizing the gap between the mechanical datums 122 and 124 relative to the initial position.

Figure 5F:
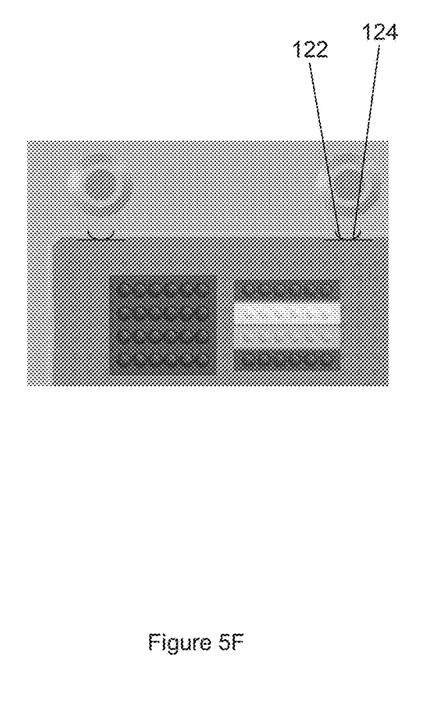

Further, as illustrated in FIG. 5F, the surface tension continues to draw the optical socket 114 towards the interposer 112 until the mechanical datums 122 and 124 contact each other and the gaps between the datums are eliminated. Once the mechanical datums 122 and 124 contact each other, movement of the optical socket 114 ceases or stops and the optical socket 114 reaches its final or second position. In the final position, when the mechanical datums 122 and 124 contact each other, the optical socket 114 is precisely aligned with the optical emitters 106 and photodetectors 107 such that when the optical connector 101 is inserted into the optical socket 114, the optical connector 101 is also brought into precise alignment with the optical emitters 106 and photodetectors 107. Depending on the exact implementation, a non-zero solder restoring force may or may not remain between the optical socket 114 and interposer 112 once the mechanical datums reach their final alignment positions.

As discussed above, such improved optoelectronic systems and methods of assembly thereof can simplify the assembly process, remove or reduce need for precision assembly equipment, enable use of a high volume automated flip chip assembly process, reduce assembly time and costs, or improve overall assembly tolerance.

In the foregoing description, numerous details are set forth to provide an understanding of the subject disclosed herein. However, implementations may be practiced without some or all of these details. Other implementations may include additions, modifications, or variations from the details discussed above. It is intended that the appended claims cover such modifications and variations. The specification and drawings are, accordingly, to be regarded as illustrative rather than restrictive.

It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list, and any combination of the items in the list. As used herein, the terms "connected," "coupled," or any variant thereof means any connection or coupling, either direct or indirect, between two or more elements; the coupling or connection between the elements can be physical (e.g., mechanical), logical, electrical, optical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. An optoelectronic system comprising:
a substrate;
an interposer coupled directly to the substrate comprising one or more optical emitters and one or more photodetectors mounted thereto, the interposer fabricated with one or more mechanical datums along one or more outer edges of the interposer, the optical emitters and photodetectors located on the interposer with respect to positions of the mechanical datums;
an optical connector comprising a ferrule and an optical fiber coupled to the ferrule;
an optical socket comprising one or more mechanical datums corresponding to the mechanical datums of the interposer, the optical socket configured to receive the optical connector, the optical socket configured to align the optical connector with the emitters and the photodetectors on the interposer when the optical socket is coupled directly to the substrate such that the mechanical datums of the optical socket contact respective mechanical datums of the interposer and the optical connector is received in the optical socket.

2. The optoelectronic system of claim 1, wherein the optical socket is soldered to the substrate via a solder reflow process.

3. The optoelectronic system of claim 2, wherein the respective datums of the optical socket and the interposer are spaced apart by a gap between 100 and 200 µm when the optical socket is initially positioned on the substrate prior to the solder reflow process.

4. The optoelectronic system of claim 2, wherein the optical socket is pulled toward the interposer via surface tension during the solder reflow process until the mechanical datums of the optical socket contact respective mechanical datums of the interposer.

5. The optoelectronic system of claim 4, wherein the movement of the optical socket relative to the interposer stops when the mechanical datums of the optical socket contact respective mechanical datums of the interposer.

6. The optoelectronic system of claim 1, wherein at least one of the mechanical datums of the interposer or the socket include a coating or are formed from low friction material.

7. The optoelectronic system of claim 1, wherein the substrate includes an array of inner pads and an array of outer pads, the array of outer pads extending around a perimeter of the array of inner pads.

8. The optoelectronic system of claim 7, wherein the interposer is flip chip assembled to the array of inner pads of the substrate and wherein the optical socket is soldered to the substrate via the array of outer pads, the respective datums of the optical socket and the interposer initially spaced apart by a gap, wherein the optical socket is pulled toward the interposer via surface tension during a solder reflow process until the mechanical datums of the optical socket contact respective mechanical datums of the interposer such that the optical connector received within the optical socket is aligned with the emitters and the photodetectors on the interposer.

9. The optoelectronic system of claim 8, wherein the interposer includes flip chip pads on a top side of the interposer, the one or more optical emitters and one or more photodetectors mounted to the interposer via the flip chip pads.

10. The optoelectronic system of claim 9, wherein the mechanical datums of the interposer and the flip chip pads are formed via a lithographic process and the mechanical datums being further formed via an etching process such that the mechanical datums are precisely aligned relative to the flip chip pads and the one or more optical emitters and one or more photodetectors are precisely aligned relative to the mechanical datums after being mounted to the interposer.

11. A method of assembling an optoelectronic system, the method comprising:
providing a substrate;
coupling an interposer directly to the substrate, the interposer comprising one or more optical emitters and one or more photodetectors, the interposer fabricated with one or more mechanical datums along one or more outer edges of the interposer, the emitters and photodetectors located on the interposer with respect to positions of the mechanical datums;
inserting an optical connector comprising a ferrule and an optical fiber coupled to the ferrule in an optical socket;
coupling the optical socket directly to the substrate, the optical socket comprising one or more mechanical datums corresponding to the mechanical datums of the interposer, the optical socket configured to align the optical connector with the emitters and the photodetectors on the interposer when the optical socket is coupled to the substrate such that the mechanical datums of the optical socket contact respective mechanical datums of the interposer and the optical connector is received in the optical socket.

12. The method of claim 11, wherein coupling the optical socket to the substrate comprises soldering the optical socket to the substrate via a solder reflow process.

13. The method of claim 12, wherein the respective datums of the optical socket and the interposer are spaced apart by a gap between 100 and 200 μm when the optical socket is initially positioned on the substrate prior to the solder reflow process.

14. The method of claim 12, comprising pulling the optical socket toward the interposer via surface tension during the solder reflow process until the mechanical datums of the optical socket contact respective mechanical datums of the interposer.

15. The method of claim 14, wherein movement of the optical socket relative to the interposer stops when the mechanical datums of the optical socket contact respective mechanical datums of the interposer.

16. The method of claim 1, wherein at least one of the mechanical datums of the interposer or the socket include a coating or are formed from low friction material.

17. The method of claim 1, wherein the substrate includes an array of inner pads and an array of outer pads, the array of outer pads extending around a perimeter of the array of inner pads.

18. The method of claim 17, wherein coupling the interposer to the substrate comprises flip chip assembling the interposer to the array of inner pads of the substrate and wherein coupling the optical socket to the substrate comprises soldering the optical socket to the substrate via the array of outer pads, the respective datums of the optical socket and the interposer initially spaced apart by a gap, wherein the optical socket is pulled toward the interposer via surface tension during a solder reflow process until the mechanical datums of the optical socket contact respective mechanical datums of the interposer such that the optical connector received within the optical socket is aligned with the emitters and the photodetectors on the interposer.

19. The method of claim 18, wherein the interposer includes flip chip pads on a top side of the interposer, the one or more optical emitters and one or more photodetectors mounted to the interposer via the flip chip pads prior to or after coupling the interposer to the substrate.

20. The method of claim 19, wherein the mechanical datums of the interposer and the flip chip pads are formed via a lithographic process and the mechanical datums being further formed via an etching process such that the mechanical datums are precisely aligned relative to the flip chip pads and the one or more optical emitters and one or more photodetectors are precisely aligned relative to the mechanical datums after being mounted to the interposer.

* * * * *